US008720650B2

(12) United States Patent
Wu

(10) Patent No.: US 8,720,650 B2
(45) Date of Patent: May 13, 2014

(54) HUB ASSEMBLY FOR A WHEELCHAIR

(76) Inventor: Yu-Ming Wu, Hemei Township, Changhua County (TW)

( * ) Notice: Subject to any disclaimer, the term of this patent is extended or adjusted under 35 U.S.C. 154(b) by 100 days.

(21) Appl. No.: 13/561,600

(22) Filed: Jul. 30, 2012

(65) Prior Publication Data

US 2013/0033092 A1 Feb. 7, 2013

(30) Foreign Application Priority Data

Aug. 3, 2011 (CN) ...................... 2011 2 0279886 U

(51) Int. Cl.
*B62B 5/04* (2006.01)

(52) U.S. Cl.
USPC ............ 188/2 F; 188/31; 188/2 D; 192/17 R; 192/12 B; 192/46

(58) Field of Classification Search
CPC ...... B60T 1/005; B60T 7/122; B60T 2201/06
USPC ............. 188/31, 2 F, 2 D, DIG. 2; 192/219.1, 192/219.2, 219.5, 43.1, 45.1, 17 R, 12 B, 46, 192/64; 301/6.1
See application file for complete search history.

(56) References Cited

U.S. PATENT DOCUMENTS

| | | | | |
|---|---|---|---|---|
| 3,905,457 | A * | 9/1975 | Shea | 475/204 |
| 4,733,755 | A * | 3/1988 | Manning | 188/2 F |
| 4,934,490 | A * | 6/1990 | Chang | 188/31 |
| 5,211,414 | A * | 5/1993 | Galumbeck | 280/250.1 |
| 5,401,044 | A * | 3/1995 | Galumbeck | 280/250.1 |
| 5,799,756 | A * | 9/1998 | Roberts et al. | 188/2 F |
| 5,845,746 | A * | 12/1998 | Henrickson et al. | 188/2 F |
| 6,193,022 | B1 * | 2/2001 | Bode | 188/2 D |
| 2004/0112703 | A1 * | 6/2004 | Kremer | 192/46 |
| 2007/0052196 | A1 * | 3/2007 | Taylor | 280/250.1 |
| 2009/0166996 | A1 * | 7/2009 | Spindle | 280/250.1 |

* cited by examiner

*Primary Examiner* — Thomas Irvin
(74) *Attorney, Agent, or Firm* — William E. Pelton, Esq.; Cooper & Duham LLP

(57) ABSTRACT

A hub assembly for a wheelchair has a hub device and a switch device. The hub device has a hub shell, an axle, a ring and a ratchet. The ratchet has a cylinder section. The cylinder section has a recess formed in an outer surface of the cylinder section. The switch device has a pin and a wire. The pin is capable of being selectively inserted into the recess. The wire is securely connected with the pin. Because the pin is inserted into the recess and the ratchet engages the ring, the hub shell along with a wheel cannot be moved unintentionally backward on a ramp.

14 Claims, 8 Drawing Sheets

HUB ASSEMBLY FOR A WHEELCHAIR

BACKGROUND OF THE INVENTION

1. Field of the Invention

The present invention relates to a hub assembly for a wheelchair, and more particularly to a hub assembly capable of preventing a wheelchair from unintentionally rolling backwards.

2. Description of Related Art

A conventional wheelchair tends to roll back on a ramp, so a conventional rolling-back prevention assembly is mounted on the wheelchair to secure wheels of the wheelchair. Consequently, the wheelchair is prevented from moving backward on the ramp.

However, the rolling-back prevention assembly has to be turned off when the wheelchair needs to move forward up the ramp. At the moment of when the rolling-back prevention assembly is turned off, the wheelchair simultaneously rolls back due to the weight of the wheelchair and a patient. Consequently, a user is easily hit by the rolling-backwards wheelchair and gets hurt.

Furthermore, the rolling-back prevention assembly needs to be turned off every time when the wheelchair needs to move forward, and this is inconvenient in use.

To overcome the shortcomings, the present invention tends to provide a hub assembly for a wheelchair to mitigate the aforementioned problems.

SUMMARY OF THE INVENTION

The main objective of the invention is to provide a hub assembly for a wheelchair capable of preventing a wheelchair from unintentionally rolling backwards on a ramp.

A hub assembly for a wheelchair has a hub device and a switch device. The hub device has a hub shell, an axle, a ring and a ratchet. The ratchet has a cylinder section. The cylinder section has a recess formed in an outer surface of the cylinder section. The switch device has a pin and a wire. The pin is capable of being selectively inserted into the recess. The wire is securely connected with the pin. Because the pin is inserted into the recess and the ratchet engages the ring, the hub shell along with a wheel cannot be unintentionally moved backward on a ramp.

Other objects, advantages and novel features of the invention will become more apparent from the following detailed description when taken in conjunction with the accompanying drawings.

DETAILED DESCRIPTION OF PREFERRED EMBODIMENT

Figure 1:
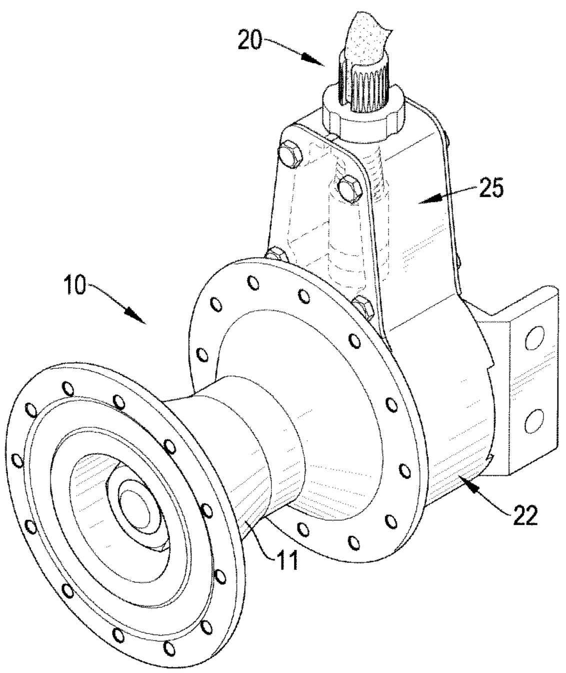
FIG. 1 is a perspective view of a first embodiment of a hub assembly for a wheelchair in accordance with the present invention.
Figure 2:
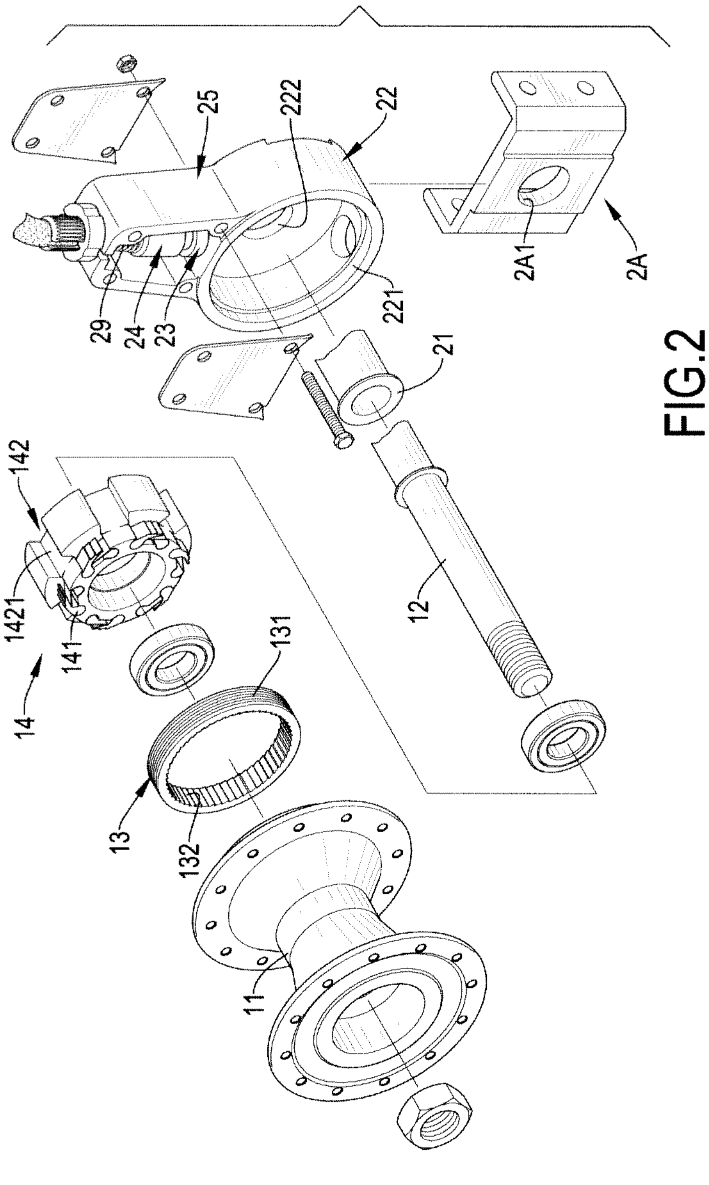
FIG. 2 is a partially exploded perspective view of the hub assembly in FIG. 1.
Figure 3:
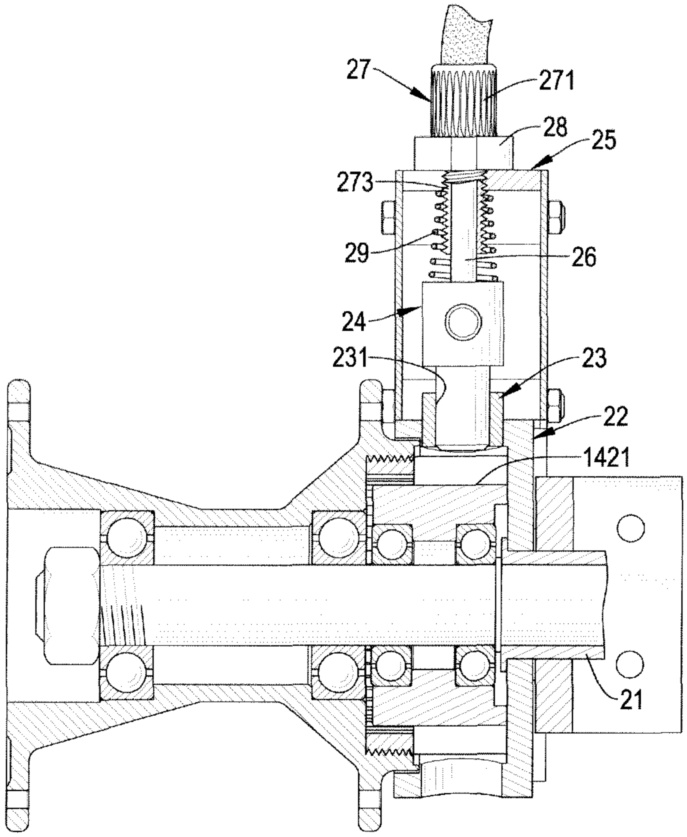
FIG. 3 is a side view in partial section of the hub assembly in FIG. 1.

With reference to FIGS. 1 to 3, a first embodiment of a hub assembly for a wheelchair in accordance with the present invention comprises a hub device 10 and a switch device 20.

The hub device 10 has a hub shell 11, an axle 12, a ring 13 and a ratchet 14.

The hub shell 11 has an inner surface. The axle 12 is detachably mounted through the hub shell 11, and the hub shell 11 is capable of rotating relative to the axle 12.

The ring 13 is securely mounted in the hub shell 11 and has an outer surface, an inner surface, a threaded section 131 and a tooth section 132.

The threaded section 131 is formed around the outer surface of the ring 13 and is securely connected with the inner surface of the hub shell 11. The tooth section 132 is formed around the inner surface of the ring 13.

The ratchet 14 is rotatably mounted around the axle 12 and has an outer surface, a pawl section 141 and a cylinder section 142.

The pawl section 141 is formed on the outer surface of the ratchet 14 and engages the tooth section 132 of the ring 13. Preferably, the pawl section 141 has six pawl elements. The cylinder section 142 radially protrudes from the ratchet 14, is adjacent to the pawl section 141 and has an outer surface and multiple recesses 1421. Preferably, six recesses 1421 are implemented. The recesses 1421 are formed in the outer surface of the cylinder section 142 and extend along lines parallel to an axis of the ratchet 14.

Figure 4:
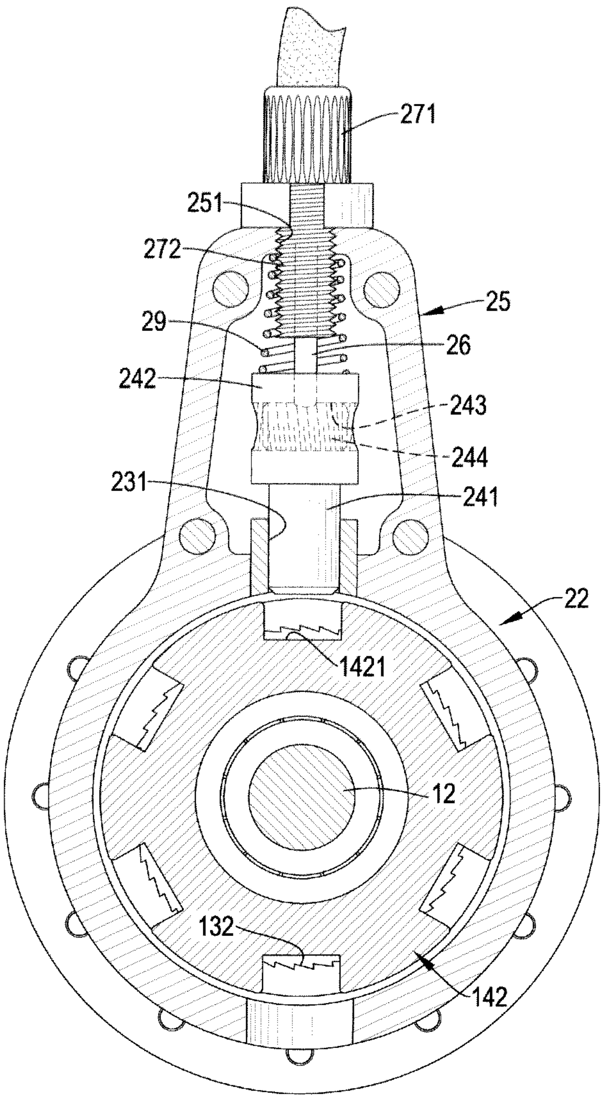
FIG. 4 is an enlarged side view in partial section of the hub assembly in FIG. 1.

With reference to FIGS. 2 to 4, the switch device 20 is connected with the hub device 10 and has a sleeve 21, a housing 22, a cap 23, a pin 24, a mount 25, a wire 26, a guiding tube 27, a locknut 28 and a spring 29. The sleeve 21 is mounted around the axle 12.

The housing 22 is mounted through by the axle 12, is mounted around the sleeve 21, and has a cross section, an outer surface, a housing receptacle and a housing hole 222. The cross section of the housing 22 is round. The housing receptacle is formed in the housing 22 and has a housing opening 221 facing the hub shell 11. The housing hole 222 is axially formed through the housing 22, communicates with the housing receptacle and is mounted around the sleeve 21.

The cap 23 is inserted into the housing 22 and has a cap hole 231 formed through the cap 23.

The pin 24 is mounted through the cap hole 231 and is capable of being selectively inserted into one of the recesses 1421. Preferably, the pin 24 has a main body 241, an abutted portion 242, a threaded through hole 243 and a grub screw 244. The main body 241 of the pin 24 is slidably mounted through the cap hole 231.

The abutted portion 242 is securely and integrally connected with the main body 241, is located outside the housing 22 and has a top surface and a diameter greater than that of the main body 241. Because the diameter of the abutted portion 242 is larger than that of the main body 241, the abutted portion 242 can prevent the pin 24 from further entering the cap hole 231 and the pin 24 can be positioned. The threaded through hole 243 of the pin 24 is formed through the abutted portion 242. The grub screw 244 is securely screwed into the threaded through hole 243 of the pin 24.

The mount 25 is hollow, is integrally mounted on the outer surface of the housing 22, encompasses the pin 24 and has an outer surface, an inner surface, a cross section and a mount aperture 251. The cross section of the mount 25 is trapezoid. The mount aperture 251 is formed in the mount 25 and aligns with the cap hole 231.

The wire 26 is slidably mounted through mount aperture 251 and is securely connected with the pin 24. Preferably, an end of the wire 26 is mounted through the top surface of the abutted portion 242, is mounted in the threaded through hole 243 of the pin 24 and is retained in by the grub screw 244. The grub screw 244 clamps against and secures the end of the wire 26

The guiding tube 27 is inserted into the mount aperture 251 and has a head portion 271, a tube portion 272 and a groove 273. The head portion 271 is located outside and above the mount 25. The tube portion 272 is securely and integrally connected with the head portion 271 and is securely inserted into the mount aperture 251 by threads. The groove 273 is lengthwise formed in the guiding tube 27. The groove 273 allows the wire 26 to be placed into the guiding tube 27.

The locknut 28 is mounted around the wire 26 and is pressed by the head portion 271 of the guiding tube 27 and the outer surface of the mount 25. When the rotating guiding tube 27 drives the tube portion 272 to move along the mount aperture 251, the head portion 271 can press the locknut 28 more tightly.

The spring 29 is normally compressed. The spring 29 is located in the mount 25, is mounted around the wire 26 and has a first end and a second end. The first end of the spring 29 abuts the inner surface of the mount 25 and is mounted around the tube portion 272. The second of the spring 29 is opposite to the first end of the spring 29 and abuts the abutted portion 242.

Preferably, the switch device 20 has a bracket 2A. The bracket 2A is connected with the housing 22 and has a cross section, a central area and a bracket hole 2A1. The cross section of the bracket 2A is U-shaped. The bracket hole 2A1 is formed through the central area of the bracket 2A and is mounted around the sleeve 21.

Figure 6:
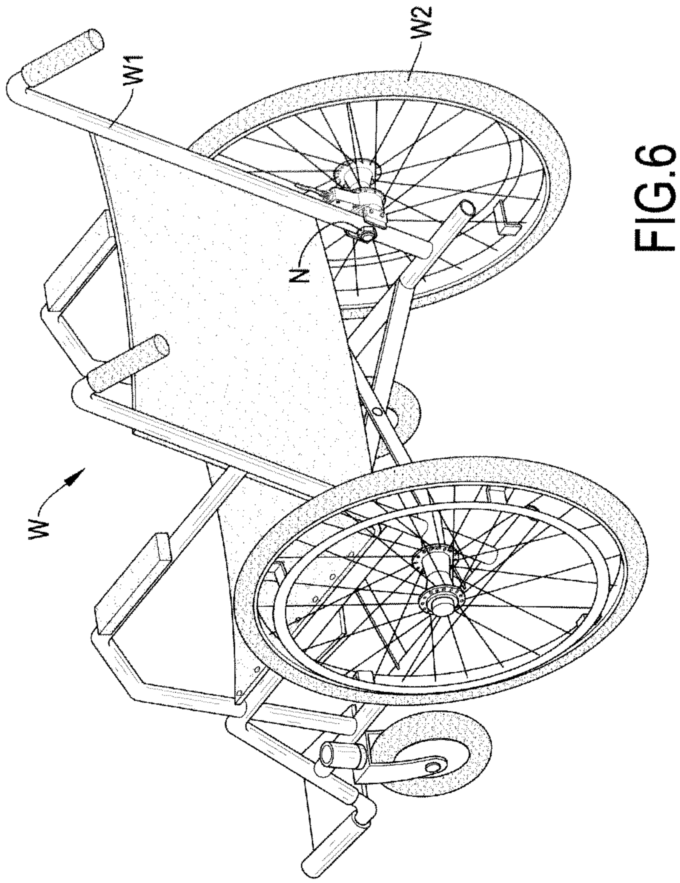
FIG. 6 is an operational perspective view of the hub assembly in FIG. 1 showing that the hub assembly is mounted on a wheelchair.

With further reference to FIG. 6, to be connected with a wheelchair W, the bracket 2A is securely mounted on a rod W1 of the wheelchair W. The axle 12 is mounted through the housing hole 222 and the bracket hole 2A1. A nut N is mounted around the axle 12, so the axle 12 can be securely mounted on the rod W1. Finally, the hub shell 11 is securely connected with a wheel W2 of the wheelchair W. The wire 26 is connected with a lever of the wheelchair. When the lever is operated by a user, the wire 26 can be slid.

Figure 5:
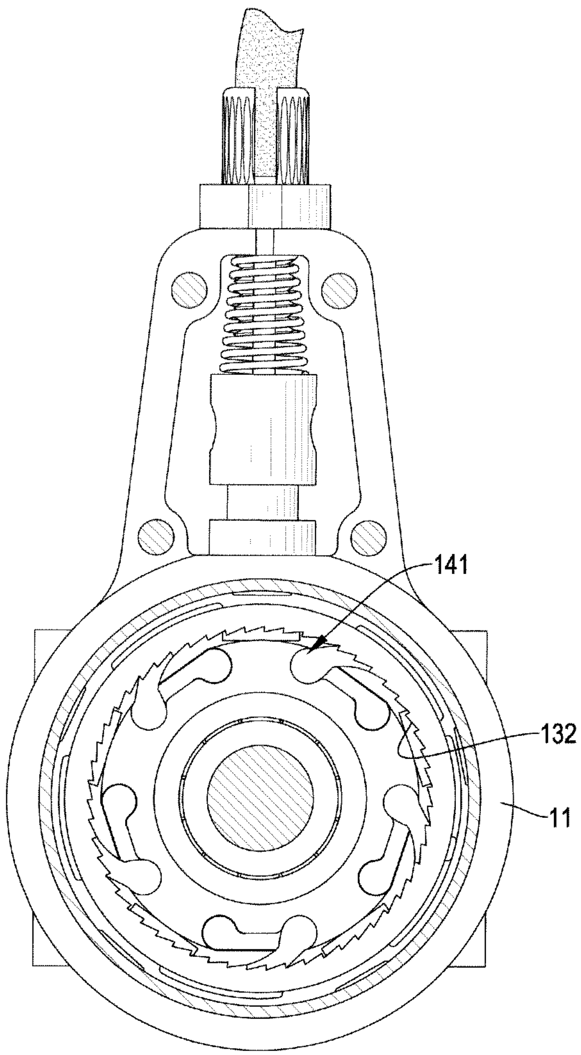
FIG. 5 is another enlarged side view in partial section of the hub assembly in FIG. 1.
Figure 7:
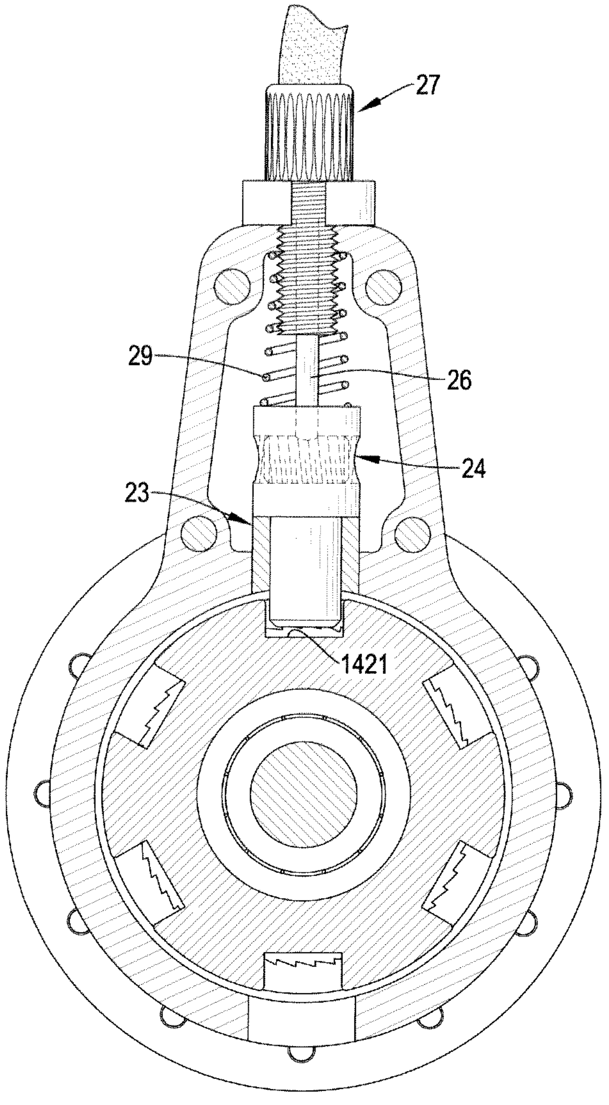
FIG. 7 is an operational side view in partial section of the hub assembly in FIG. 4 showing that the pin is inserted into one of the recesses.

The hub assembly for a wheelchair in accordance with the present invention has two operational modes, a normal mode as shown in FIGS. 3 to 5 and a rolling-backwards prevention mode as shown in FIG. 7.

1. Normal Mode:

When the wheelchair W is placed on a flat ground, the user switches the lever and the hub assembly is on the normal mode.

Because the wire 26 is lifted, the main body 241 of the pin 24 is held in a position that is above the cylinder section 142, and the spring 29 is compressed. Accordingly, the main body 241 is not inserted into one of the recesses 1421, and the cylinder section 142 of the ratchet 14 can be rotated.

To make wheelchair W move forward, the wheel W2 is rotated forward by the user, and the hub shell 11 is rotated in clockwise as shown in FIG. 5. Because the pawl section 141 does not engage with the tooth section 132, the hub shell 11 is not limited by the ratchet 14 and can be rotated in clockwise.

To make wheelchair W move backward, the wheel W2 is rotated backward by the user, and the hub shell 11 is rotated in counterclockwise in FIG. 5. Because the pawl section 141 engages the tooth section 132 and the ratchet 14 is rotatable on the normal mode, the hub shell 11 and the ratchet 14 can be rotated in counterclockwise. Consequently, the wheelchair W can move backward.

2. Rolling-backwards Prevention Mode:

When the wheelchair W is placed on a ramp, the user switches the lever and the hub assembly is on the rolling-backwards prevention mode.

The spring 29 is released to make the main body 241 of the pin 24 inserted into one of the recesses 1421. Accordingly, the cylinder section 142 of the ratchet 14 is restricted by the pin 24 and cannot be rotated.

The wheelchair W tends to move backward because the wheelchair W is on the ramp. Accordingly, the hub shell 11 tends to rotate in counterclockwise. Because the pawl section 141 engages the tooth section 132 and the ratchet 14 is restricted by the pin 24, the hub shell 11 cannot be rotated and the wheel W2 cannot rotate backward. Consequently, the wheelchair W cannot move backward on the ramp.

To make wheelchair W move forward on the ramp, the wheel W2 is rotated forward by the user, and the hub shell 11 is rotated in clockwise as shown in FIG. 5. Although the ratchet 14 cannot be rotated, the pawl section 141 does not engage the tooth section 132, the hub shell 11 is not limited by the ratchet 14 and can be rotated clockwise. Consequently, the wheelchair W can still move forward on the ramp.

Preferably, two hub assemblies in accordance with the present invention may be implemented and respectively mounted on two wheels W2 of the wheelchair W.

Figure 8:
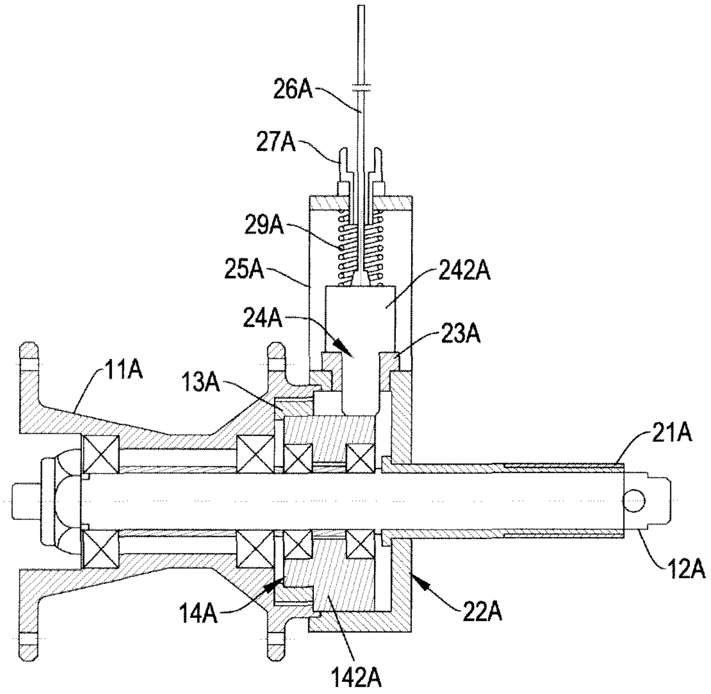
FIG. 8 is a side view in partial section of a second embodiment of a hub assembly for a wheelchair in accordance with the present invention.

With reference to FIG. 8, a second embodiment of the hub assembly for wheelchair in accordance with the present invention is substantially the same as the first embodiment except detailed appearances are different. The second embodiment has a hub shell 11A, an axle 12A, a ring 13A, a sleeve 21A, a housing 22A, a cap 23A, a pin 24A, a mount 25A, a wire 26A, a guiding tube 27A and a spring 29A. The ratchet 14A has a cylinder section 142A. The pin 24A has an abutted section 242A.

From the above description, it is noted that the present invention has the following advantage:

Prevention from unintentional rolling backwards on the ramp:

Because the pin 24,24A is inserted into the recess 1421 and the pawl section 141 engages the tooth section 132, the hub shell 11 and the wheel W2 cannot be move backward on the ramp. Furthermore, the wheel W2 can still move forward because the pawl section 141 does not engage the tooth section 132. With the switch device 20 and the cylinder section 142,142A, the hub assembly can prevent the wheelchair W from rolling back on the ramp and this is very safe and convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hub assembly for a wheelchair, the hub assembly comprising:
a hub device having
a hub shell having an inner surface;
an axle mounted through the hub shell, wherein the hub shell is capable of rotating relative to the axle;
a ring securely mounted in the hub shell and having
an outer surface;
an inner surface;
a threaded section formed around the outer surface of the ring and securely connected with the inner surface of the hub shell; and
a tooth section formed around the inner surface of the ring; and
a ratchet rotatably mounted around the axle and having
an outer surface;
a pawl section formed on the outer surface of the ratchet and engaging the tooth section of the ring; and
a cylinder section radially protruding from the ratchet, adjacent to the pawl section and having
an outer surface; and
a recess formed in the outer surface of the cylinder section and extending along a line parallel to an axis of the ratchet; and
a switch device connected with the hub device and having
a housing mounted through by the axle and having
a housing receptacle formed in the housing and having a housing opening facing the hub shell;
a pin mounted into the housing and capable of being selectively inserted into the recess;
a mount mounted on the housing and having a mount aperture formed in the mount; and
a wire slidably mounted through mount aperture and securely connected with the pin.

2. The hub assembly for a wheelchair as claimed in claim 1, wherein
the switch device has
a guiding tube inserted into the mount aperture;
a cap mounted in the mount, inserted into the housing and having a cap hole formed through the cap; and
a spring located in the mount, mounted around the wire and having
a first end abutting the mount; and
a second opposite to the first end of the spring; and
the pin has
a main body mounted through the cap hole; and
an abutted portion securely connected with the main body, located in the mount, abutted by the second end of the spring, and having a diameter larger than that of the main body.

3. The hub assembly for a wheelchair as claimed in claim 2, wherein
the guiding tube is inserted into the first end of the spring.

4. The hub assembly for a wheelchair as claimed in claim 2, wherein
the pin has
a threaded through hole formed through the abutted portion; and
a grub screw securely screwed into the threaded through hole of the pin and pressing against the wire.

5. The hub assembly for a wheelchair as claimed in claim 3, wherein
the pin has
a threaded through hole formed through the abutted portion; and
a grub screw securely screwed into the threaded through hole of the pin and pressing against the wire.

6. The hub assembly for a wheelchair as claimed in claim 2, wherein
the guiding tube has
a head portion located outside the mount; and
a tube portion securely connected with the head portion and securely inserted into the mount aperture by threads.

7. The hub assembly for a wheelchair as claimed in claim 3, wherein
the guiding tube has
a head portion located outside the mount; and
a tube portion securely connected with the head portion and securely inserted into the mount aperture by threads.

8. The hub assembly for a wheelchair as claimed in claim 4, wherein
the guiding tube has
a head portion located outside the mount; and
a tube portion securely connected with the head portion and securely inserted into the mount aperture by threads.

9. The hub assembly for a wheelchair as claimed in claim 5, wherein
the guiding tube has
a head portion located outside the mount; and
a tube portion securely connected with the head portion and securely inserted into the mount aperture by threads.

10. The hub assembly for a wheelchair as claimed in claim 1, wherein the cylinder section has multiple recesses.

11. The hub assembly for a wheelchair as claimed in claim 2, wherein the cylinder section has multiple recesses.

12. The hub assembly for a wheelchair as claimed in claim 3, wherein the cylinder section has multiple recesses.

13. The hub assembly for a wheelchair as claimed in claim 8, wherein the cylinder section has multiple recesses.

14. The hub assembly for a wheelchair as claimed in claim 9, wherein the cylinder section has multiple recesses.

* * * * *